Figure 5:
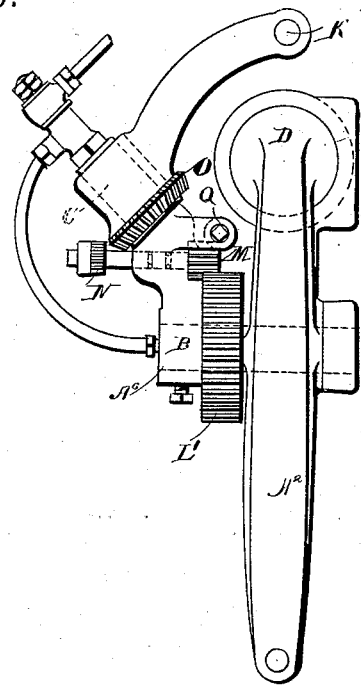

(No Model.) 5 Sheets—Sheet 1.
R. H. TWEDDELL & J. FIELDING.
APPARATUS FOR RAISING, LOWERING, AND DIRECTING PORTABLE RIVETING MACHINES.
No. 307,356. Patented Oct. 28, 1884.
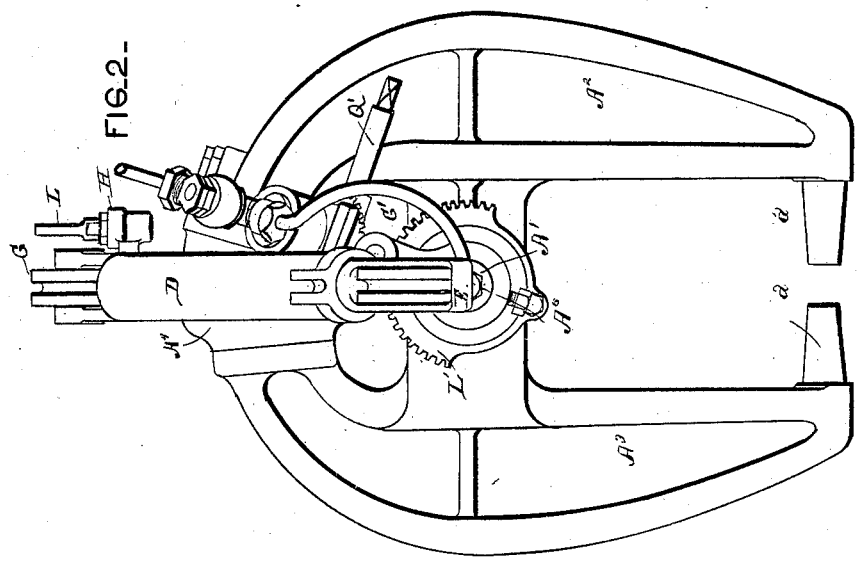
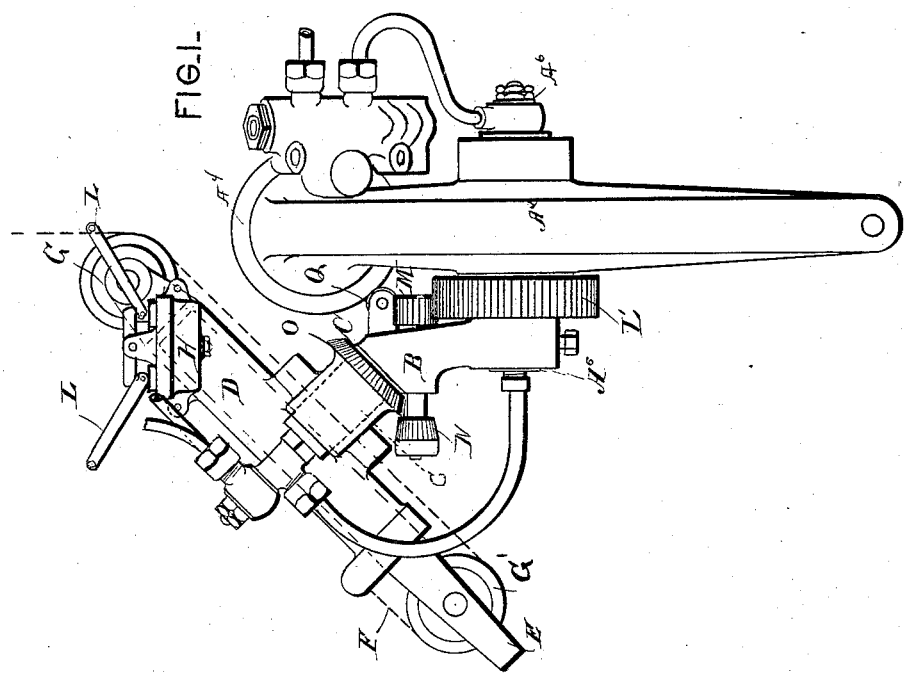
WITNESSES
Wm. T. Gill.
Geo. F. Downing.
INVENTORS
Ralph Hart Tweddell
John Fielding.
By H. A. Seymour Atty

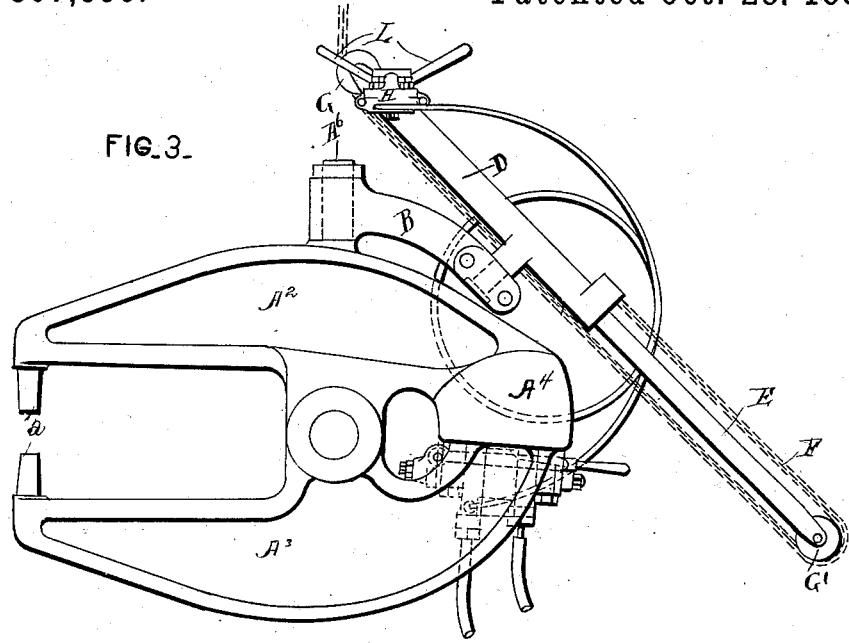
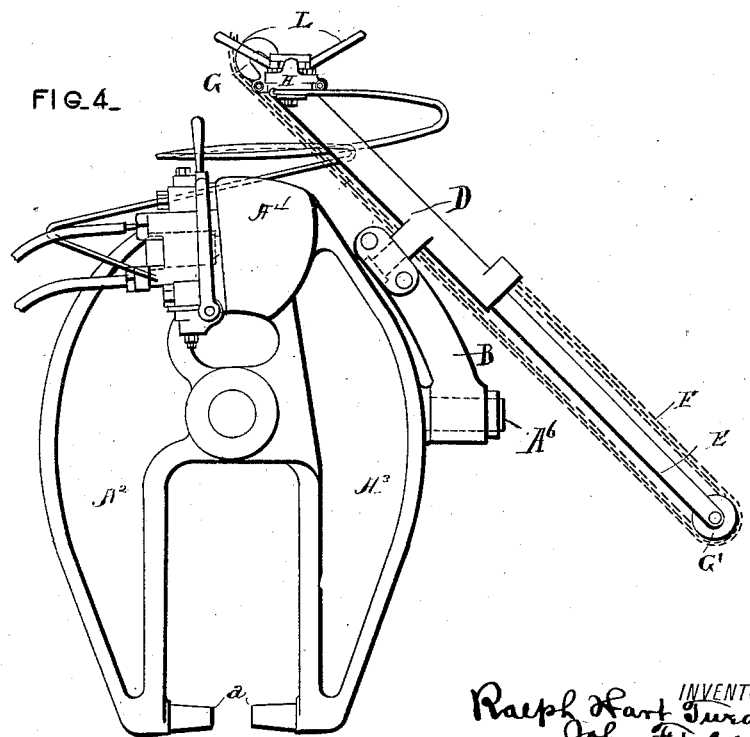

(No Model.) 5 Sheets—Sheet 3.
R. H. TWEDDELL & J. FIELDING.
APPARATUS FOR RAISING, LOWERING, AND DIRECTING PORTABLE RIVETING MACHINES.

No. 307,356. Patented Oct. 28, 1884.

WITNESSES
Wm T. Gill.
Geo. F. Downing.

INVENTORS
Ralph Hart Tweddell
John Fielding
By H. A. Seymour
ATTORNEY (No Model.) 5 Sheets—Sheet 4.

R. H. TWEDDELL & J. FIELDING.
APPARATUS FOR RAISING, LOWERING, AND DIRECTING PORTABLE
RIVETING MACHINES.

No. 307,356. Patented Oct. 28, 1884.

WITNESSES
Wm. T. Gill
Geo. F. Downing

INVENTORS
Ralph Hart Tweddell
John Fielding
By H. A. Seymour Atty

N. PETERS. Photo-Lithographer, Washington, D. C.

(No Model.) 5 Sheets—Sheet 5.
R. H. TWEDDELL & J. FIELDING.
APPARATUS FOR RAISING, LOWERING, AND DIRECTING PORTABLE RIVETING MACHINES.
No. 307,356. Patented Oct. 28, 1884.
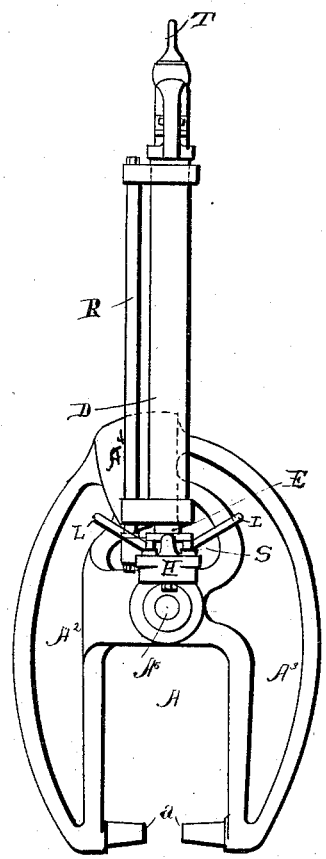
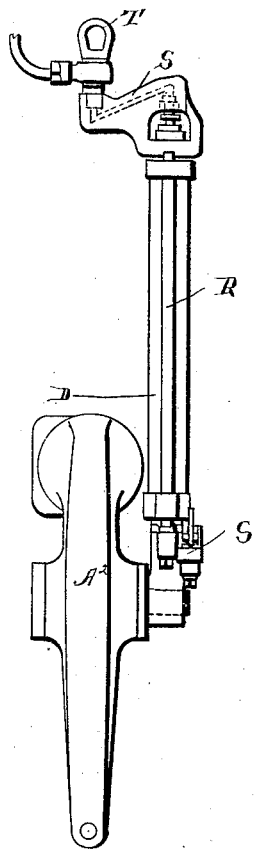
WITNESSES
INVENTORS
ATTORNEY

UNITED STATES PATENT OFFICE.

RALPH HART TWEDDELL, OF WESTMINSTER, COUNTY OF MIDDLESEX, AND JOHN FIELDING, OF GLOUCESTER, COUNTY OF GLOUCESTER, ENGLAND.

APPARATUS FOR RAISING, LOWERING, AND DIRECTING PORTABLE RIVETING-MACHINES.

SPECIFICATION forming part of Letters Patent No. 307,356, dated October 28, 1884.

Application filed June 21, 1884. (No model.) Patented in England September 28, 1882, No. 4,609.

*To all whom it may concern:*

Be it known that we, RALPH HART TWEDDELL, of Westminster, county of Middlesex, and JOHN FIELDING, of Gloucester, in the county of Gloucester, and country of England, have invented certain new and useful Improvements in Apparatus for Raising, Lowering, and Directing Portable Riveting-Machines; and we do hereby declare the following to be a full, clear, and exact description of the invention, such as will enable others skilled in the art to which it appertains to make and use the same.

Our invention relates to an improvement in apparatus for raising, lowering, and directing portable metal-working tools.

When portable riveting and similar machines are employed in the construction of iron vessels, bridges, and other structures, it is necessary to raise and lower them and to move them into different attitudes, so as to direct their tools on the various parts of the work which they have to perform; and our invention relates more particularly to the construction and arrangement of apparatus for supporting and altering the level and direction of such machines, the chief object which we have in view being to arrange this apparatus in a compact form at or on the machine itself, its movements being under the control of the person working the machine. At some convenient part of the framing of the machine we provide a trunnion having its axis in a line preferably passing through the center of gravity of the machine, and on this trunnion we fit a bent radial arm, terminating in a pin, the axis of which is also in a line passing through the center of gravity in the plane of the axis of the trunnion, but inclined to it at an angle of about forty-five degrees. On this pin we fit a second arm that can turn on it as an axis. On this arm we fix a hydraulic cylinder with its plunger having a chain or chains passing round pulleys on it and on the arm, and led up from one of these pulleys to some convenient point of suspension. By admitting water under pressure to the hydraulic cylinder, or permitting water to be discharged therefrom, the chain is drawn in or slacked out, and thus the machine is raised or lowered, and by turning the machine on its trunnion, and turning the radial arm relatively to the second arm, the machine can be directed into various attitudes, so as to bring its tools into suitable relation to their work. The plunger of the hydraulic cylinder may have multiplying pulleys, so that a comparatively small stroke of the plunger may take up or let out a considerable length of the chain; also, the hydraulic cylinder, instead of being fixed on the arm, as above described, may be fixed on the machine itself, or on the radial arm, the chain being led from it by guide-pulleys to and along the arm, or led direct to the point of suspension, the second arm being in that case dispensed with. The hydraulic cylinder may be itself suspended by a bracket projecting from its sides, so as to bring the point of suspension over the center of gravity of the machine, the hydraulic plunger being in that case made with an eye in which the trunnion can work. In some cases we connect the two arms by gearing to one another and to the framing of the machine, so that when the machine makes a partial revolution round the axis of its trunnion the trunnion itself, with the machine, revolves partly round the point of suspension of the second arm.

Figure 6:
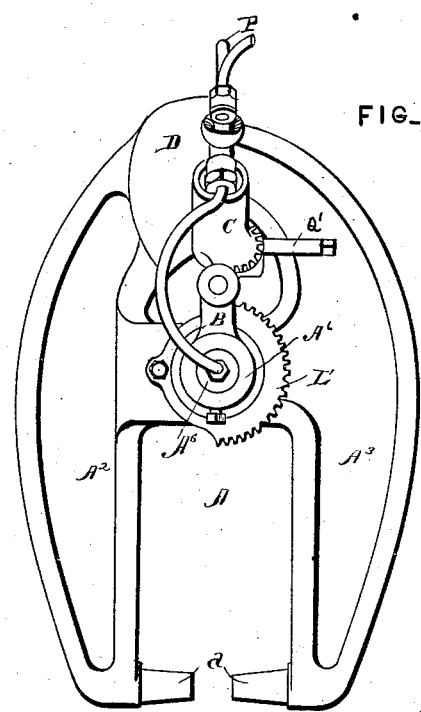
Figure 7:
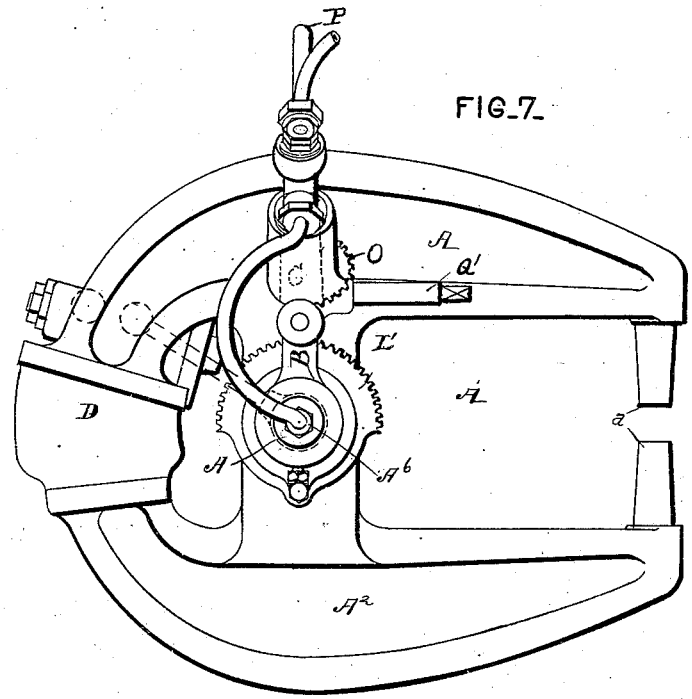
Figure 8:
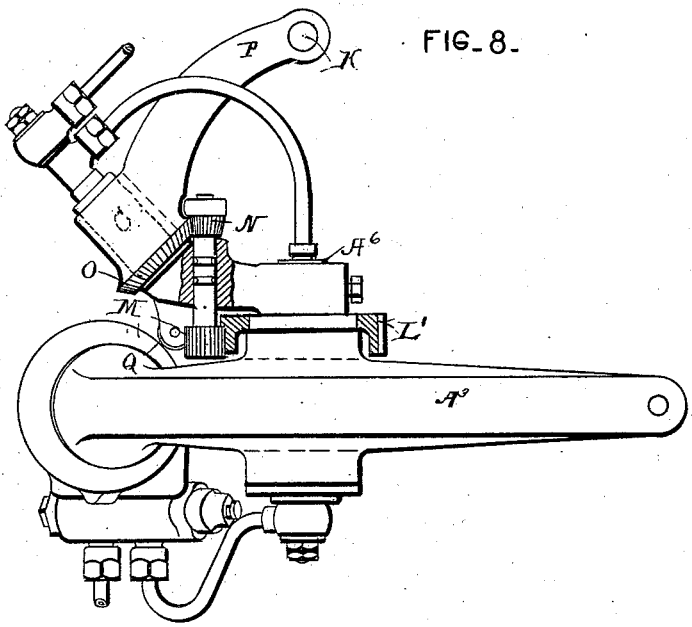

In the accompanying drawings, Figures 1 and 2 are views in elevation of a portable riveting-machine, showing it in two different positions; and Figs. 3, 4, 5, 6, 7, 8, 9, and 10 represent modified structures shown in different attitudes.

Our improvement, which is shown and described in combination with a portable riveting-machine, is applicable for punching, shearing, and similar machines, and hence we do not confine the improvement to riveting-machines. The riveting-machine herein shown is composed of two levers, $A^2$ and $A^3$, pivoted together at $A'$, one of said levers being provided at one end with a cylinder, $A^4$, while the lever is provided with a plunger adapted to work in said cylinder. This device is preferably operated by hydraulic pressure, and is provided with the riveting-tools a.

$A^6$ is the trunnion, with its axis nearly in a line passing through the center of gravity of the machine, and B is a bent radial arm attached to trunnion $A^6$, and having at its end a trunnion, C, the axis of which is also nearly in a line passing through the center of gravity of the machine, and is inclined at about forty-five degrees to the axis of the trunnion $A^6$. The trunnion C supports the hydraulic cylinder D, the plunger E of which carries a pulley, G', for the chain F, that passes round a guide-pulley, G, mounted on the end of the cylinder D, and extends up to the point of suspension. The cylinder D is provided with a valve-box, H, having a supply and a discharge valve, which can be worked by cords attached to the valve-levers L L, and supplied with water from an accumulator or other pressure-supply. By means of these valves the plunger E can be subjected to hydraulic pressure or relieved therefrom. In the one case the chain F is drawn upon and the riveting-machine is raised. In the other case the chain is let out and the machine is lowered. When a considerable range of ascent and descent is required, the cylinder D and plunger E may be provided with compound or multiplying pulleys, as in hydraulic cranes.

The construction shown in Figs. 3 and 4 differs but slightly from the construction shown in Figs. 1 and 2. In this instance the trunnion $A^6$, instead of forming the axis of the levers, is formed integral with one of the levers in a line passing through the said axis, and is journaled in one end of suspending-arm B, the upper end of which receives the trunnion of the hydraulic-lift cylinder D.

Figs. 5, 6, 7, and 8 are views of a hydraulic riveter turned to various attitudes on double trunnions $A^6$ and C, arranged relatively to the machine and to each other as shown in Figs. 1 and 2 and previously described, with gearing by which, when required, the movements round the two axes of motion $A^6$ and C can be coupled. In these figures we have not shown the hydraulic cylinder and chain for raising or lowering the machine, as it may be separate or independent from the riveter, the chain from it or from a crane or other hoist taking hold of the machine by the eye K of the arm P. The gearing connecting the two axes of movement $A^6$ and C, and shown in Figs. 1, 2, 5, 6, 7, and 8, consists of a toothed segment, L', fixed on the body of the machine, and gearing with a pinion, M, having its axis mounted in the radial arm B. On the axis of M is a bevel-pinion, N, which can be slid into or out of gear with a bevel-segment, O, fixed on the suspending-arm P. On turning a worm, Q, on shaft Q', which gears with the pinion M, the machine can be made to revolve round the axis $A^6$, and if the pinion N be in gear with segment O the whole can be turned round the axis of trunnion C.

With these structures the hydraulic lift can be applied either inclined or vertical, as desired. In cases where the machine requires to be turned on a single axis, the trunnion $A^6$ may be journaled directly to the hydraulic plunger E, as shown in Figs. 9 and 10. This plunger works in the cylinder D, and is preferably made hollow for the purpose of supplying water to the cylinder $A^6$ of the riveter, and the cylinder and plunger are steadied and guided by the rod R. This telescopic lift is attached to a bracket, S, projecting laterally from the suspending-trunnion T, so as to bring the center of gravity of the machine vertically under the point of suspension.

We do not claim, broadly, in this application the form or construction of the riveting-machine, a telescopic lift for vertically adjusting the machine, nor devices for turning the riveter, as these features are respectively shown, described, and claimed in pending applications numbered 135,571, 131,314, 134,962, and 135,668.

Having fully described our invention, what we claim as new, and desire to secure by Letters Patent, is—

1. The combination, with the levers of a portable riveting-machine, one of said levers being provided with a trunnion situated on a line passing through the axis of said levers, of a hydraulic lift provided with a trunnion situated on a line passing through the axis of the levers and at an angle of about forty-five degrees from the trunnion on the riveting-machine, and the suspending-arm B, connecting the trunnion of the lift with the trunnion of the riveting-machine, substantially as set forth.

2. The combination, with a portable riveting-machine provided with a laterally-projecting trunnion, of a hydraulic lift, consisting, essentially, of a cylinder, plunger, and valve for controlling the lift-pulley G and chain, and the arm B, connecting the riveting-machine with the lift, all of the above parts combined and adapted to operate as described.

3. The combination, with the hydraulic riveting-machine, consisting, essentially, of two levers, $A^2$ $A^3$, pivoted together, one of said levers being provided with a cylinder, while the other is provided with a plunger, and either provided with a laterally-projecting trunnion, of the hydraulic lift, consisting, essentially, of the cylinder, valve, plunger, chain, and pulley G, and the arm B, connecting the cylinder of the plunger to the trunnion of the riveting-machine, substantially as set forth.

4. The combination, with a portable riveting-machine, a supporting-arm, B, and a suspending device journaled to said arm, of a pinion rigidly secured to the riveting-machine, a pinion rigidly secured to the suspending device, and a longitudinally-sliding shaft provided with pinions for engaging the pinions on the riveting-machine and supporting device.

5. The combination, with a portable riveting-machine, the supporting-arm B, and hydraulic lift, of a pinion secured to the riveting-machine, a pinion secured to the lift, an intermediate sliding shaft provided with pinions, and a shaft provided with a worm, all of the above parts combined as described.

6. The combination, with a portable riveting-machine provided with the trunnions situated as described, of a supporting device or arm journaled to the inclined trunnion, and the intermediate gearing for coupling the movements around the two axes of motion.

In testimony whereof I have signed this specification in the presence of two subscribing witnesses.

RALPH HART TWEDDELL.

Witnesses:
 H. G. SCOTT,
 WM. BAILEY.

In testimony whereof I have signed this specification in the presence of two subscribing witnesses.

JOHN FIELDING.

Witnesses:
 GILMORE G. BAKER,
 H. CADENNE.